United States Patent [19]

Suzuki et al.

[11] Patent Number: 5,095,238
[45] Date of Patent: Mar. 10, 1992

[54] BRUSHLESS DC MOTOR AND ROTOR MAGNET

[75] Inventors: Yuzuru Suzuki; Sakae Fujitani; Hitoshi Takahashi, all of Shizuoka, Japan

[73] Assignee: Minebea Co., Ltd., Tokyo, Japan

[21] Appl. No.: 503,699

[22] Filed: Apr. 3, 1990

[51] Int. Cl.⁵ .................. H02K 21/22; H02K 29/08
[52] U.S. Cl. .................. 310/156; 310/67 R; 310/186
[58] Field of Search .......... 310/154, 156, 186, 268, 310/67 R, 261

[56] References Cited

U.S. PATENT DOCUMENTS

| | | | |
|---|---|---|---|
| 3,500,090 | 3/1970 | Baermann | 310/154 |
| 4,031,419 | 6/1977 | Spiesberger et al. | 310/186 |
| 4,549,104 | 10/1985 | Nimura et al. | 310/156 |
| 4,562,399 | 12/1985 | Fisher | 310/156 |
| 4,788,464 | 11/1988 | Nishikawa et al. | 310/156 |
| 4,893,040 | 1/1990 | Turner et al. | 310/156 |

Primary Examiner—Steven L. Stephan
Assistant Examiner—D. L. Rebsch
Attorney, Agent, or Firm—Alan H. Levine

[57] ABSTRACT

A brushless dc motor comprising a stator, and a rotor incorporating a hollow cylindrical permanent magnet. The rotor magnet has sectors magnetized radially in opposite directions to define poles of opposite polarity extending around the circumference of the magnet. The magnet is completely magnetized so as to leave no non-magnetized sectors between the poles of the magnet. The magnet has grooves in its surface facing the stator, the grooves extending in the longitudinal direction of the magnet. Each groove is offset from, or non-symmetrical with respect to, the center of the rotor pole in which it is located.

10 Claims, 6 Drawing Sheets

BRUSHLESS DC MOTOR AND ROTOR MAGNET

The present invention relates to a brushless dc motor, comprising a stator having magnetic poles with coils and interpoles, a rotor magnet of cylindrical shape, radially magnetized, having magnetic grooves on its surface facing the stator, and a rotor position sensor, and more particularly to the rotor magnet used in a brushless dc motor.

A technology whereby a combination of a stator having interpoles as well as magnetic poles with coils, and a rotor magnet with a special magnetized pattern, keeps the electromagnetic force from vanishing at a certain rotor position, stabilizes starting of a brushless dc motor. The magnetized pattern formed on the rotor magnet divides the rotor circumference by 3 P / 2 and is arranged in the order of N pole, S pole, and non-magnetized area. This technology is set forth, for example, in U.S. Pat. No. 3,299,335. As for technologies for sensing rotor position, one of them uses a disc with a slit directly linked with a rotor to detect the rotor position by a photoelectric converter, while another uses a separate magnet on a rotor to detect the rotor position by a magnetoelectricity converter, e.g., a Hall effect device.

Figure 10:
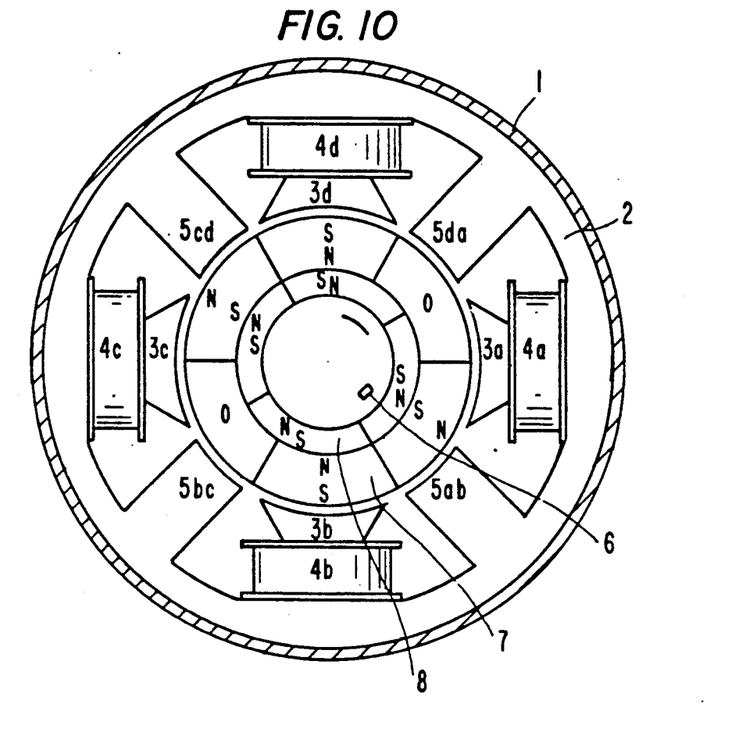
FIG. 10 is a sectional view of a conventional motor.

FIG. 10 illustrates a prior art inner-rotor brushless dc motor of 4-pole construction with a single magnetoelectricity converter for rotor position sensing The stator comprises a motor case 1, a stator yoke 2, four stator magnetic poles arranged at regular intervals 3a, 3b, 3c, 3d, coils wound around each of the stator magnetic poles 4a, 4b, 4c, 4d, and inter-poles 5ab, 5bc, 5cd, 5da, arranged halfway between the stator magnetic poles. The rotor consists of a torque-generating rotor main magnet 7 and a rotor position sensing magnet 8. A magnetoelectricity converter 6 is fixed opposite the rotor position sensing magnet 8. The rotor main magnet 7 is magnetically divided on its circumference at angles of every 60 degrees. The sections are S pole, non-magnetized area, N pole, S pole, non-magnetized area, and N pole, respectively, in this order.

Figure 11:
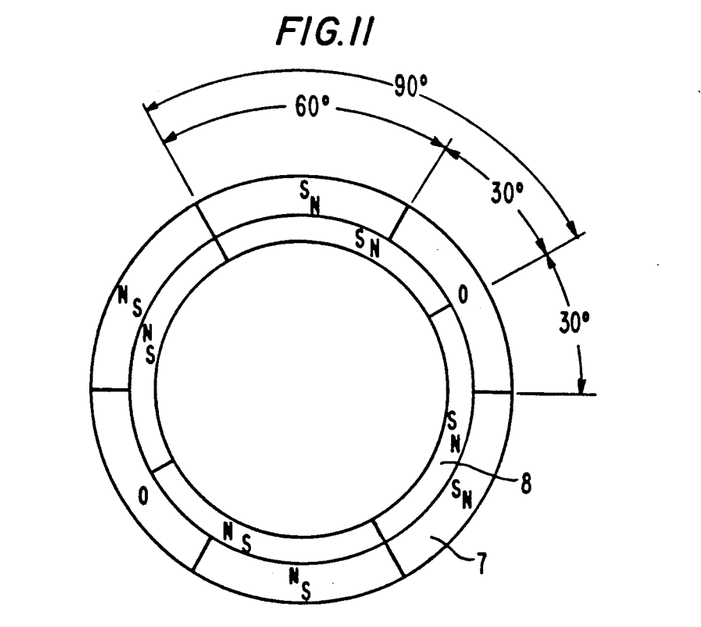
FIG. 11 is a detail of the rotor magnet.

The magnetic poles of the rotor main magnet 7, and those of the rotor position magnet 8, are positioned as shown in FIG. 11.

Where the rotor position sensing magnet 8 and the magnetoelectricity converter 6 are positioned as shown in FIG. 10, stator magnetic poles 3a, 3c are excited to N poles and the other stator magnetic poles and inter-poles are excited to S poles, when coils 4a, 4c are energized. Then, the N poles of rotor main magnet 7 and the N pole magnetized stator magnetic poles 3a, 3c repel each other, causing the rotor to rotate clockwise (as indicated by an arrow). After the rotor rotates through a 90-degree arc, coils 4a, 4c are deenergized and at the same time coils 4b, 4d are energized. Then, stator magnetic poles 3b, 3d are excited to N poles and the other stator magnetic poles and inter-poles are excited to S poles. Consequently, a magnetic repulsion, between the N poles of rotor main magnet 7 and the N pole-magnetized stator poles, keeps the rotor rotating clockwise.

Each time the rotor rotates through a 90-degree arc, the magnetizing converter 6 senses changes of magnetic poles and energizes coils 4a, 4c and coils 4b, 4d, alternatively, keeping the rotor rotating in one direction.

Figure 12A:
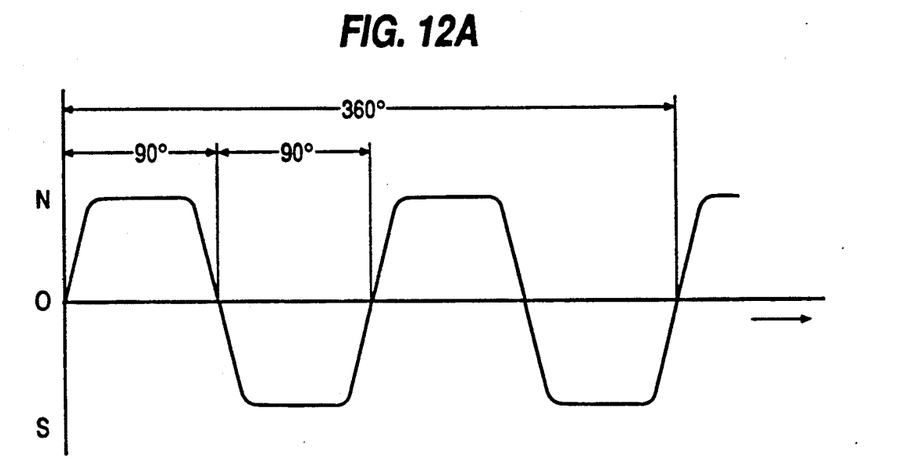
Figure 12B:
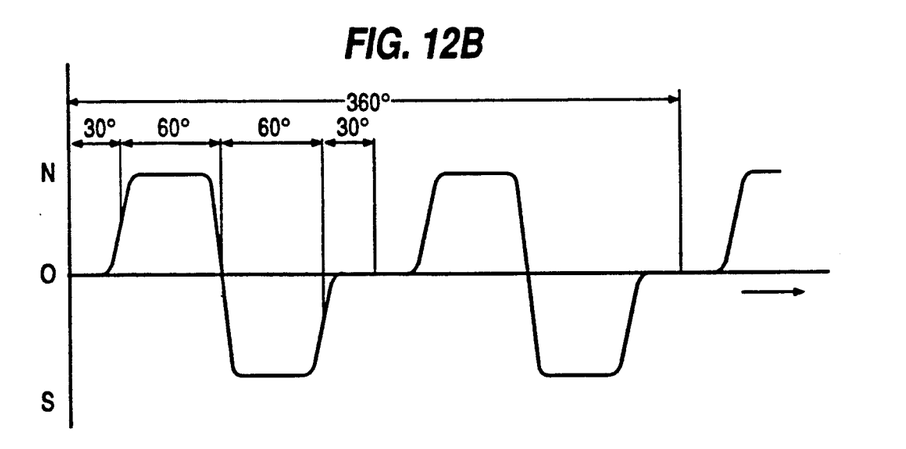

FIGS. 12 A and B, respectively, illustrate the surface distribution of magnetic flux density for the rotor main magnet 7 and that for the rotor position sensing magnet 8.

A brushless dc motor described above of the prior art construction is characterized by stable motor driving torque and small detent torque but has the following disadvantages.

The special magnetic pattern of the rotor magnet makes it difficult to mass-produce motors of uniform characteristics. The prior art requires non-magnetized areas to be formed on the rotor magnet, and for this purpose, requires a special yoke-shaped magnetizing head. Also the difference in magnetizing devices (magnetization power supply, magnetization voltage, electrostatic capacity of power supply, etc.) or changes of surrounding temperature cause a dispersion of spatial distribution of magnetic flux density. Being largely dependent on the magnetized pattern of the rotor magnet, motor characteristics vary acutely when space distribution of magnetic flux density is uneven.

In addition, in a construction where a magnetoelectricity converter is used for rotor position sensing, a rotor position sensing magnet 8 needs to be used in addition to a torque-generating rotor main magnet 7. This makes the rotor construction even more complicated.

The present invention has for its object eliminating the problems of the prior art as thus far described, and relates to a brushless dc motor and a rotor magnet to be used therein, wherein the rotor magnet is entirely magnetized with no non-magnetized areas required, thereby facilitating the magnetization, and whereby space distribution of magnetic flux density is less uneven.

The present invention, which eliminates the aforementioned technical problems, relates in a preferred embodiment to (1) a brushless dc motor comprising a stator having magnetic poles with coils and inter-poles, a rotor made of a cylindrical magnet radially magnetized, and a rotor position sensor, wherein the rotor rotates around the stator forming a radial flux structure, and the rotor magnet has magnetic grooves on its inner surface facing the stator and is entirely magnetized, and (2) a rotor magnet to be used therein.

"Magnetic grooves" mentioned herein refers not only to apparent grooves in the ordinary sense, but also to an instance where non-magnetized reinforcements are filled in such grooves and even to an instance where plastic magnets are filled in the grooves cut in a high-performance magnet, such as a rare-earth magnet. "A rotor magnet" mentioned herein includes one made of multiple materials being formed into a nearly cylindrical shape, as well as one of completely uniform structure. The term "cylindrical" used herein has a broader sense and includes reference to being ring-shaped, etc.

In this invention, the entire rotor magnet is completely magnetized without having any non-magnetized area, and the rotor has magnetic grooves in its surface opposite the stator. Because of this, if the rotor magnet and the stator are assembled into a motor, the desired space magnetic flux density is obtained by changing its permeance in a circumferential direction. The stator with interpoles and the rotor magnet with a specific space magnetic flux density are combined to produce torque at any position of the rotor and to ensure stable starting.

In this invention, only one magnetoelectricity converter, e.g., Hall effect device, installed in the stator surface opposed to the rotor, is enough to detect the position of the rotor, and the invention does not require a rotor position detection magnet as required by the conventional technology.

In the accompanying drawings:

FIG. 5 A-E show illustrative sectional shapes of the grooves cut in the respective rotor magnet;

FIGS. 12 A and B are graphs illustrating the difference in surface distribution of magnetic flux density between the rotor position sensing magnet A and the rotor main magnet B.

Figure 1:
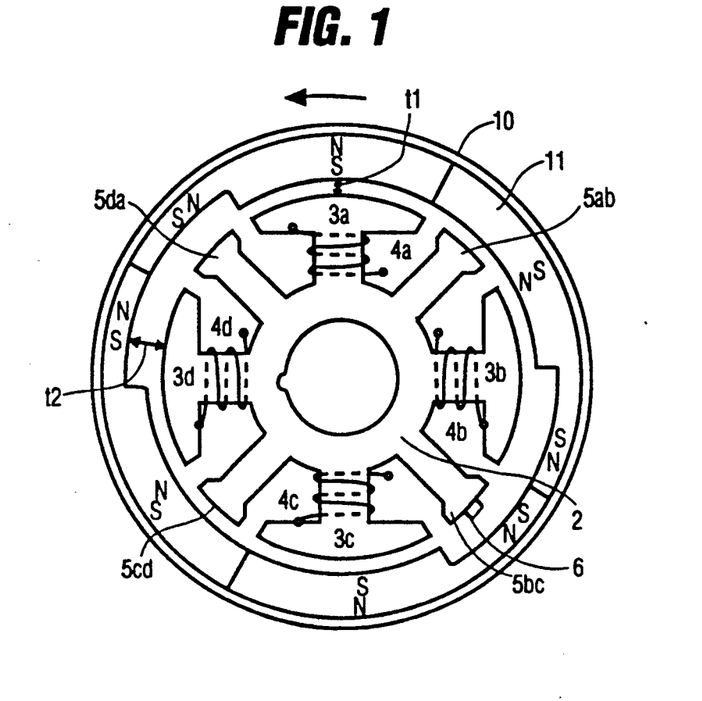
FIG. 1 is a schematic cross-sectional view of a brushless dc motor according to this invention.

FIG. 1 is a cross-sectional view of a brushless dc motor according to this invention, and an example of a 4-pole outer-rotor-type motor. As the basic parts of the stator section are almost the same as those of the conventional technology shown in FIG. 10, its corresponding parts are shown with identical reference numerals for easy reference.

The stator includes one stator yoke 2, four stator magnetic poles 3a, 3b, 3c, and 3d, which are positioned at a spaced angle of 90 degrees in succession to the stator yoke, four coils 4a, 4b, 4c, and 4d, which are wound around the stator magnetic poles, and four interpoles 5ab, 5bc, 5cd, and 5da, which are positioned between the stator magnetic poles. The magnetoelectricity converter 6, which is used to detect the position of the rotor is, for example, a Hall element or the like, and it is installed to face a below-mentioned rotor magnet 11 in the vicinity of the top of interpole 5bc.

Figure 2:
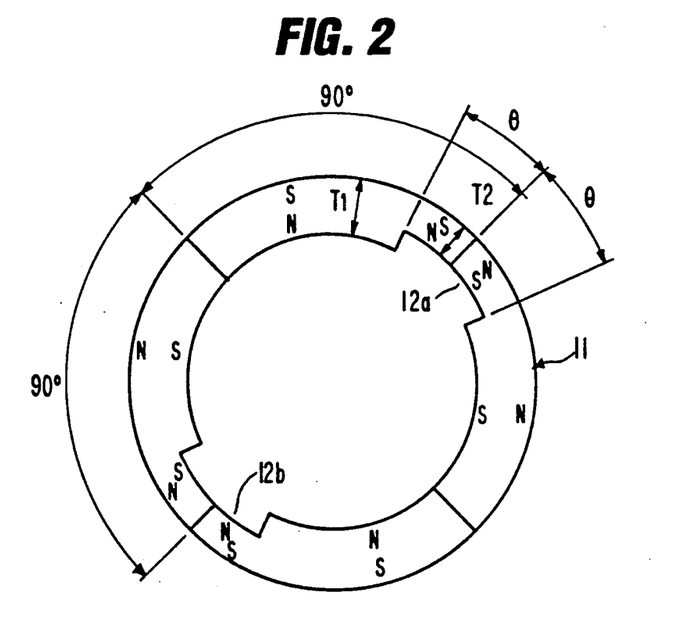
FIG. 2 is a detail of the rotor magnet shown in FIG. 1.
Figure 3:
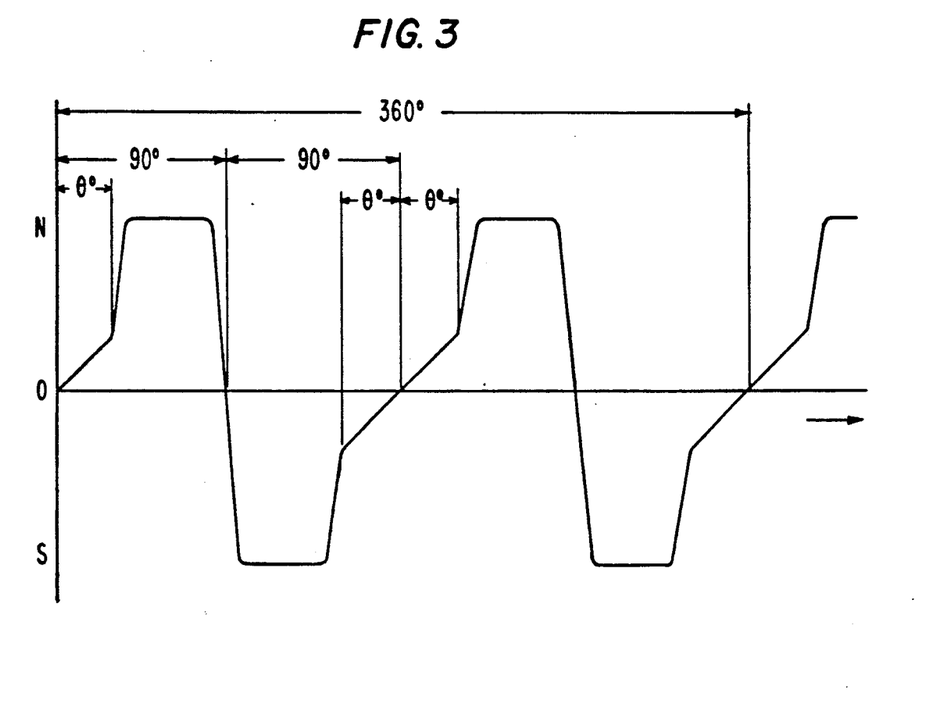
FIG. 3 is a graph illustrating the surface distribution of magnetic flux density as to the magnet.

The rotor includes rotor yoke 10 and rotor magnet 11, and it is mounted so as to rotate freely about a central axis (not shown). The details of rotor magnet 11 are shown in FIG. 2, and its surface magnetic flux density in FIG. 3. Rotor magnet 11 is radially 4-pole-magnetized and has two grooves 12a and 12b. In the case of four poles, a circular arc of 2 theta degrees is formed with a magnetic pole switching point (neutral point) as a symmetrical axis having theta degrees each at both sides thereof. Due to the magnetic grooves 12a and 12b, the surface magnetic flux density of rotor magnet 11 is distributed in the direction of the circumference, as shown in FIG. 3. That is, at the grooves 12a and 12b as compared to other parts, the magnetic flux density on the surface with which the stator magnetic poles interlink becomes extremely low and comes close to the surface magnetic density distribution shown in FIG. 12B on the conventional rotor main magnet. On the other hand, as the neutral points come to the position of 90 degrees in the case of 4-pole, an additional rotor position detector magnet for the conventional technology, as shown in FIG. 10, is not required. If the groove width of rotor magnet 11 is 2 thetas as viewed from a central angle, then the arrangement of the grooves and the magnetic poles is as follows, and the unit of the angles is degrees.

N pole (90 - Theta); S pole (90 - Theta); Groove S Pole (Theta); Groove N pole (Theta); N pole (90 - Theta); S pole (90 - Theta); Groove S pole (Theta); Groove N pole (Theta).

This invention is characterized by the following: the magnetic grooves are formed so as to give magnetic changes in a circumferential direction, and the rotor magnet is so constructed that its whole can be magnetized without having any non-magnetized area, and this eliminates the need for both a rotor main magnet and a rotor position detection magnet.

The operating principle of such a brushless dc motor constructed as above is the same as that of the aforementioned conventional technology. With the position relationship between rotor magnet 11 and magnetoelectricity converter 6 fixed as shown in FIG. 1, if coils 4b and 4d are energized, and stator magnetic poles 3b and 3d, and the other stator magnetic poles and interpoles are excited to N and S poles, respectively, the N pole of rotor magnet 11 and the N poles of stator magnetic poles 3b and 3d repel each other magnetically and the rotor rotates counterclockwise (in the direction of the arrow in FIG. 1). When the rotor rotates to 90 degrees, coils 4b and 4d are de-energized, and at the same time, coils 4a and 4c are energized. This causes stator magnetic poles 3a, 3c, and the other stator magnetic poles and interpoles to be excited to N and S poles, respectively. As a result, the rotor continues to rotate counterclockwise because the N pole of rotor magnet 11 and the N poles of stator magnetic poles 3a and 3c repel each other magnetically.

At this point interpoles 5ab, 5bc, 5cd and 5da function as a generator of torque (no dead point) at any position of the rotor.

As explained above, each time the rotor rotates through 90 degrees, magnetoelectricity converter 6 detects the changes of the magnetic poles in rotor magnet 6 and energizes a pair of coils 4a and 4c, and a pair of coils 4b and 4d, alternatively. This causes the rotor to rotate continuously in one direction.

In connection with this invention, an experiment was made for rotor magnet 11 shown in FIG. 2, and for comparison a conventional-type rotor magnet, to find the effects by groove angles of theta on the characteristics of the motor. In this experiment, with the stator construction fixed, and 40 degrees set as a groove 12a/12b angle of theta, when a motor axis torque of 10g-cm was applied, the rate of rotation and the motor current values were obtained. Table 1 shows the results and the motor efficiency based on them.

TABLE 1

| Characteristics | Conventional Technology | Invented Technology | | | |
|---|---|---|---|---|---|
| | | Theta = 15 | Theta = 20 | Theta = 30 | Theta = 40 |
| Rate of Rotation (rpm) | 3250 | 3080 | 3200 | 3560 | 3300 |
| Motor Current (mA) | 140 | 125 | 125 | 118 | 125 |
| Motor | 20 | 21.1 | 21.9 | 26 | 23 |

TABLE 1-continued

| | Conventional | Invented Technology | | | |
|---|---|---|---|---|---|
| Characteristics | Technology | Theta = 15 | Theta = 20 | Theta = 30 | Theta = 40 |
| Efficiency (%) | | | | | |

Table 1 shows that compared with the conventional technology, this invention produces a low current value and a rise in efficiency of 1 to 6%. If a 4-pole magnetized rotor magnet is used, it became clear that the motor is most efficient in the vicinity of theta=30 degrees. The experiment shown in Table 1 was made based on the relationship of t1=4t2 in which the gap between the rotor magnet and the stator is t1, and the gap between the groove and the stator is t2. This is determined by the magnetic flux density distribution and the experiment results.

Therefore, it is desirable that the shape of the groove formed in the rotor magnet should be designed to satisfy the following two formulas:

$$0.3 \times 360 / P < 2\,\text{Theta} < 360 / P \quad (1)$$

$$D \geq G \quad (2)$$

Where:
2 Theta: Central angle of the circular arc with a magnetic pole switching point (neutral point) as a symmetrical axis having Θ degrees at each side thereof
P: Number of magnetized poles
D: Center depth of the groove
G: Minimum gap between the stator and the rotor magnet The brushless motor of this invention is applicable for many purposes. Good starting and high efficiency are the characteristics of the motor, which is suitable for products such as fan motors.

Figure 4:
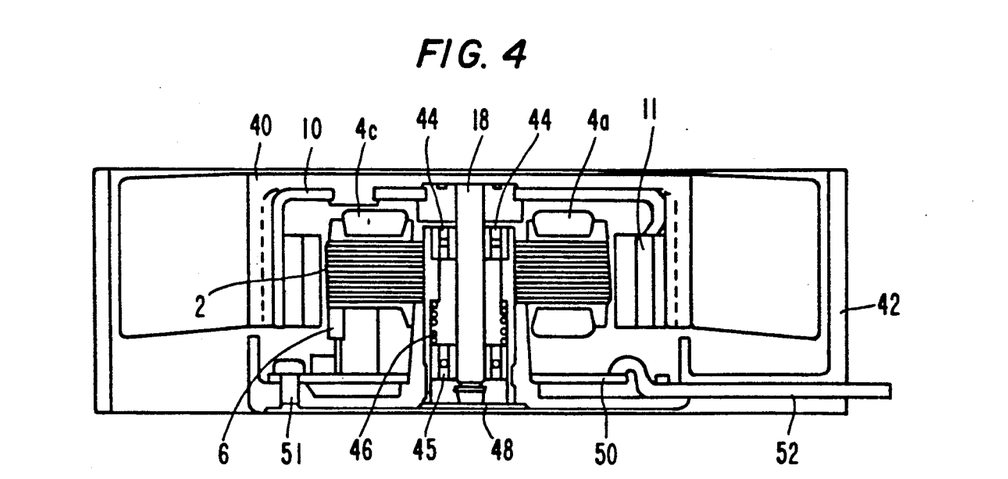
FIG. 4 is an axial cross-sectional view of the fan-motor to which this invention is applied, as an illustrative embodiment.
Figure 5A:
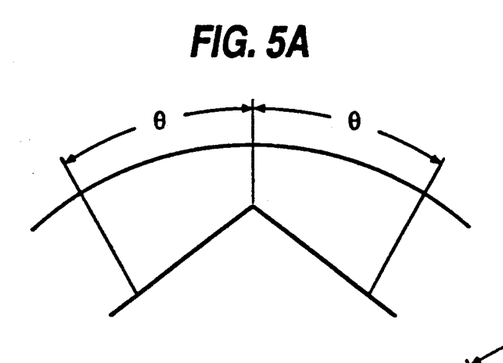
Figure 5B:
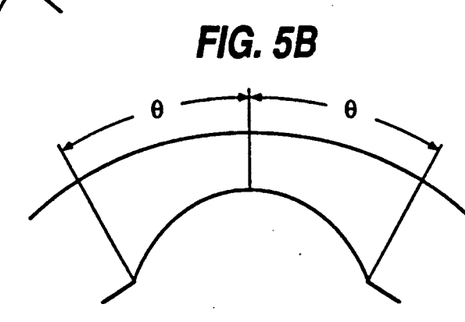
Figure 5C:
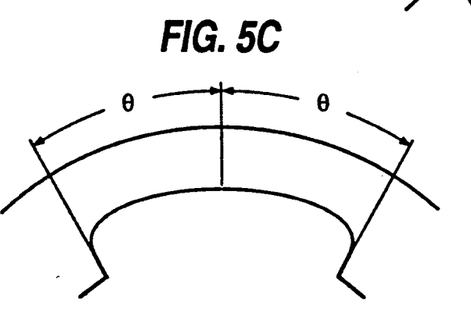
Figure 5D:
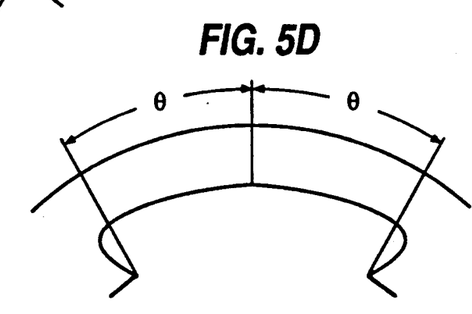
Figure 5E:
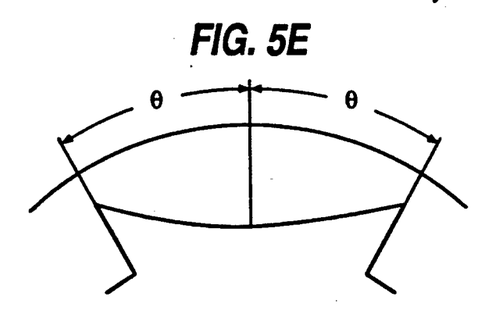

FIG. 4 shows the fan motor. FIG. 4 has reference numerals in common with FIG. 1 for easy explanation of the motor section. A rotor yoke 10 is set inside an impeller 40, molded in one piece with synthetic resin, after which both members are heat-clinched and fastened. Rotor shaft 18 is free to rotate in bearings 44 and 45 fitted into the housing 42, and is held in position with a retaining ring 48 after a spring 46 is adjusted to a given preload. The stator, made from coils 4a–4d wound on the stator yoke 2, laminated and then insulated, is fixed to the outside of a bearing holder located in the center of the housing 42.

Circuit board 50 is fastened with screws 52 to the inner side of housing 42. A logic circuit for coil excitation, switching elements, and magnetoelectricity converter 6 for rotor position sensor etc., are mounted on the circuit board 50, to which the terminal of each coil 4a–4d is also connected. The required power is supplied from an outside source by means of wire 52.

The groove cut in the rotor magnet is not limited to a rectangular shape as viewed in cross-section. There may be other different shapes, such as A~E on FIG. 5.

Example A in FIG. 5 shows a V-shape grooved structure;
Example B in FIG. 5 is a semicircle;
Example C in FIG. 5 is a groove having an arc shape on each side of its bottom;
Example D in FIG. 5 is a groove of which the bottom is curved out of central angle Theta on both edges;
to form a swelled curve toward the face of the stator.

Other different shapes of groove may be possible.

Figure 6:
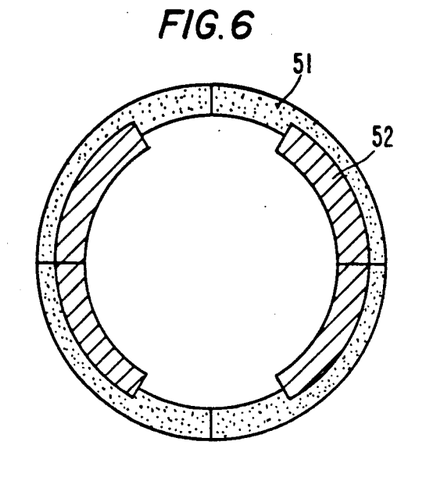
FIGS. 6 and 7 show different shapes, in sectional view, of the rotor magnet.
Figure 7:
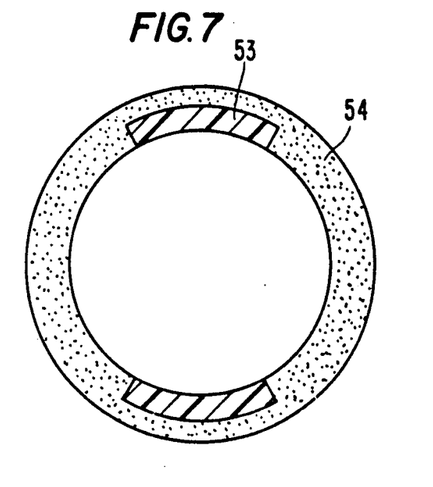

The rotor magnet structure can also possibly by changed. FIGS. 6 and FIG. 7 illustrate this. To improve the characteristics, the rotor magnet may be made up of a high performance magnet, such as a sintered or a rare-earth magnet. If such material would be used for the whole of the rotor magnet, however, it would be costly, far from cost-effective in many cases. Therefore, FIG. 6 shows that high quality magnets, such as sintered or rare-earth magnets, should be used in the desired location of, and as part of, the rotor magnet and that cheaper and easy-to-mold plastic magnets 51 be used in the desired shape for the remaining part. The structure shown in FIG. 6 enables production of a motor having high performance with respect to cost.

In the region of the grooves, the rotor magnet is thinner in cross-section and hence its strength is reduced in the vicinity of the grooves and therefore subject to deformation. Attention should be paid to handling it. FIG. 7 is a structure designed for increasing the magnet strength with proper reinforcement material 53 filling the grooved part of the rotor magnet 54. For instance, non-magnetic plastics serve the purpose of reinforcement 53. Moreover, plastic magnets are adaptable as reinforcement 53 for the rotor magnet 54 in which high performance magnets, such as sintered or rare-earth magnets are used.

Figure 8:
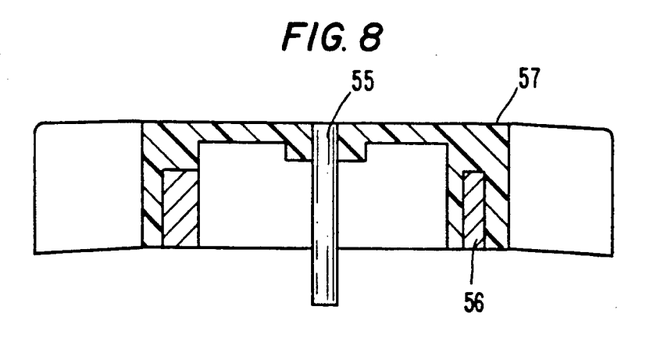
FIGS. 8 and 9 show different structures in axial sectional views of the rotor.
Figure 9:
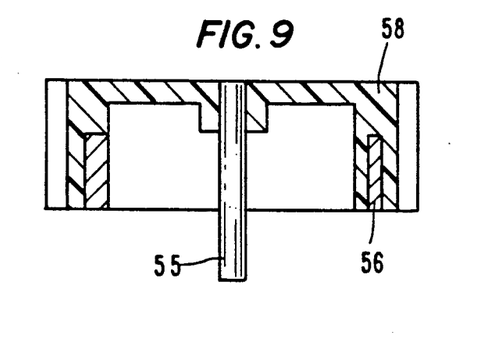

FIG. 8 and FIG. 9 show a practical structure of the rotor. If the impeller must be joined with the rotor, like a fan-motor for instance, it should be designed to make a combination of rotor magnet 56, shaft 55, and reinforcement 57 (impeller for fan-motor) as an integral molding, as in FIG. 8.

FIG. 9 is another combining form in which rotor magnet 56 and shaft 55 are joined by reinforcement 58 that incorporates gear teeth on the circumference.

Such examples of structure are not all that this invention covers. The type explained above is an outer-rotor type motor. In like manner, an inner-rotor type can be made up in combining form, with high efficiency gained as well, irrespective of a driving system or a number of magnetic poles. Of course, it is possible to make changes of the magnet, the reinforcement material, and the components structured by the reinforcement.

This invention is applicable to a photoelectro-type rotor position sensor system in addition to a magnetoelectricity converter rotor position sensor system.

This invention employs a rotor magnet which is entirely magnetized, without non-magnetized areas, does not require any magnetizing jig in a special yoke-shape, and accordingly facilitates in designing the jig, and nearly eliminates the dispersion resulting from magnetization power supply, such as magnetization voltage, capacity of magnetization power supply, etc., and provides for more steady space distribution of magnetic flux density. And, some proper change in thickness or space gap of the rotor magnet allows optional setting of space distribution of magnetic flux density.

This invention is designed for the rotor position sensor to work under the influence of the magnetized pattern of the rotor magnet contributing to the torque. The rotor structure, therefore, becomes very simple, and requires no additional rotor position sensing magnet as previously used.

In this invention, compared with previous types, operating currents are so small that high efficiency is gained and the temperature can be kept from going up. It contributes to material cost reduction because the rotor magnet can be made smaller in capacity while having the same functional performance capability as the previous type. Moreover, it helps to cut back the cogging torque. That is how the brushless dc motor related to this invention produces very significant effects on the facilitation in manufacture, the characteristic improvement in functional performance, and only a small degree of dispersion in properties.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A brushless dc motor comprising:
    a stator having magnetic poles carrying coils, and interpoles between the poles,
    a cylindrical magnet rotor rotatable with respect to the stator, the rotor being radially magnetized to define at least four poles around its periphery, the rotor being completely magnetized so as to leave no non-magnetized areas between the poles of the rotor, and
    the rotor having substantially axial grooves in its surface facing the stator, each groove being located closer to one end of one of the rotor poles than to the other end, said other end of that rotor pole being ungrooved, and each of the grooves extending circumferentially into two adjacent poles of the magnet.

2. A brushless dc motor as defined in claim 1 including a rotor position sensor, the sensor being a magnetoelectricity converter positioned adjacent to the surface of the rotor facing the stator.

3. A brushless dc motor as defined in claim 1, wherein the shape of the grooves in the rotor magnet is represented by the following two formulas:

$$0.3 \times 360 / P < 2\Theta < 360 / P$$

$$D \geq G$$

where;
    $2\Theta$: width (degrees) of the groove
    P: number of magnetized poles
    D : depth at the center of the groove
    G : the smallest gap between the stator and the rotor magnet.

4. A brushless dc motor as defined in claim 1 wherein the grooves extend in the axial direction of the rotor magnet, and the grooves extend circumferentially into two adjacent poles of the rotor.

5. A brushless dc motor as defined in claim 1 wherein the rotor magnet is formed of two different magnetic materials.

6. A brushless dc motor as defined in claim 1 wherein nonmagnetic reinforcement material fills the grooves.

7. A brushless dc motor as defined in claim 1 wherein the rotor comprises a rotor body and a rotor magnet, the magnet being embedded within the rotor body.

8. A hollow cylindrical rotor magnet, for a brushless dc motor, formed on a single piece of permanently magnetized material, the magnet having sectors magnetized radially in opposite directions to define at least four poles of opposite polarity extending around the circumference of the rotor, and the magnet having substantially axial grooves in its inner cylindrical surface extending along the length of the magnet, each groove being located closer to one end of one of the rotor poles than to the other end, said other end of that rotor pole being ungrooved, and each groove extending circumferentially into two adjacent poles of the magnet.

9. A magnet as defined in claim 8 wherein each groove extends circumferentially into two adjacent poles of the magnet.

10. A magnet as defined in claim 8 wherein the magnet is completely magnetized so as to leave no non-magnetized sectors between the poles of the magnet.

* * * * *